(12) United States Patent
Sakaguchi et al.

(10) Patent No.: US 7,591,729 B2
(45) Date of Patent: Sep. 22, 2009

(54) DOUBLE CONSTANT VELOCITY UNIVERSAL JOINT

(75) Inventors: Akio Sakaguchi, Iwata (JP); Yasuaki Takekawa, Iwata (JP)

(73) Assignee: NTN Corporation, Osaka-Fu (JP)

( * ) Notice: Subject to any disclaimer, the term of this patent is extended or adjusted under 35 U.S.C. 154(b) by 295 days.

(21) Appl. No.: 11/521,381

(22) Filed: Sep. 15, 2006

(65) Prior Publication Data

US 2007/0066407 A1 Mar. 22, 2007

(51) Int. Cl.
*F16D 3/224* (2006.01)
(52) U.S. Cl. .......................... 464/15; 464/140; 464/906
(58) Field of Classification Search .................. 464/15, 464/116, 140, 145, 171, 906
See application file for complete search history.

(56) References Cited

U.S. PATENT DOCUMENTS

| | | | | |
|---|---|---|---|---|
| 1,051,025 A | * | 1/1913 | Spicer | 464/171 X |
| 1,838,310 A | * | 12/1931 | Hubbel | 464/15 |
| 1,847,677 A | * | 3/1932 | Sternbergh | 464/145 |
| 2,574,226 A | * | 11/1951 | Sampson | 464/171 X |
| 3,017,755 A | * | 1/1962 | Miller | 464/140 |
| 4,112,709 A | * | 9/1978 | Krude | 464/140 X |

* cited by examiner

*Primary Examiner*—Greg Binda
(74) *Attorney, Agent, or Firm*—Wenderoth, Lind & Ponack, L.L.P.

(57) ABSTRACT

A double constant velocity universal joint includes two constant velocity universal joints, each having a cylindrical outer joint member with a plurality of axially extending guide grooves in a spherical inner circumferential surface thereof, an inner joint member with a plurality of axially extending guide grooves formed in a spherical outer circumferential surface, torque transmitting balls each arranged in the ball tracks formed by both guide grooves of the outer joint member and the inner joint member, and a retainer for retaining the balls. The outer joint members are coaxially united back to back, and a cover member having an inner spherical surface that makes sliding contact with the outer circumferential surface of the outer joint member is attached to a shaft that is connected to the inner joint member.

5 Claims, 4 Drawing Sheets

DOUBLE CONSTANT VELOCITY UNIVERSAL JOINT

TECHNICAL FIELD

The present invention relates to a double constant velocity universal joint composed of two constant velocity universal joints combined and mainly for use in a vehicle drive axle, and more particularly to a double constant velocity universal joint suitable for applications in which the drive axle requires a large steering angle and is used in harsh environments with splashing water and dirt and tangling grass, such as the one used for an agricultural tractor.

BACKGROUND OF THE INVENTION

Conventionally, the drive axle that requires a large steering angle such as the one used for an agricultural tractor most commonly uses a constant velocity style double Cardan joint for connecting a differential output shaft to a wheel. The double Cardan joint has a long axis and a large outside diameter, but its intersecting angle can be as large as more than 50°. A double Cardan joint has two cross shafts (spiders), and uses a total of eight bearings with needle rollers, four each per a spider, set in the journals of each spider. The bearing is composed of rollers arranged in a full complement manner without a retainer, a square U-shaped outer ring, and an oil seal that seals the roller surfaces.

Grease is filled inside the bearing as a lubricant. Because of small volume of space around the rollers, the grease needs to be replenished as required. Failure of grease replenishment at appropriate times will lead to wear of spider journals due to lack of grease and the spiders cannot satisfy their designed durability performance requirements. For this reason, the joint has a structure in which a grease nipple is provided at one location in the center of the spider, so that grease supplied from this nipple is fed to the internal of each bearing through a grease supply hole of each journal of the spider.

However, a double Cardan joint has four bearing (journal) parts in one spider. A supply of grease from one grease nipple can hardly reach all of the four bearing parts evenly and sufficiently. Some Cardan joints, therefore, include a grease nipple in the outer ring of each bearing, so that the lubricant is given evenly and sufficiently to all four bearings. In this case, however, nipples must be provided to the total of eight locations (four nipples per one spider) for the entire joint, which means grease supply is time-consuming.

SUMMARY OF THE INVENTION

An object of the present invention is to solve these problems with the double Cardan joint by providing a double constant velocity universal joint.

To solve the above problems, the present invention according to a first aspect of the present invention is characterized in that it includes two constant velocity universal joints, each having a cylindrical outer joint member with a plurality of axially extending guide grooves in a spherical inner circumferential surface thereof, an inner joint member with a plurality of axially extending guide grooves formed in a spherical outer circumferential surface thereof, torque transmitting balls each arranged in ball tracks formed by both the guide grooves of the outer joint member and the inner joint member, and a retainer for retaining the balls, and that the outer joint members are coaxially united back to back, and a cover member having an inner spherical surface that makes sliding contact with the outer circumferential surface of the outer joint member is attached to a shaft that is connected to the inner joint member.

The double constant velocity universal joint of the present invention has two constant velocity universal joints, and it can, as a whole, achieve an allowable operating angle that is twice larger than that of one constant velocity universal joint. Also, it can be used under harsh environments because the open ends of the outer joint members are mechanically sealed by inner spherical surfaces of cover members, which are made of metal, for example, and attached to the shafts of the inner joint members.

In addition to the features defined in a first aspect of the present invention, the invention according to a second aspect of the present invention is characterized in that, the outside diameter of the outer joint members on the back-to-back side is smaller than the largest outside diameter of the outer joint members so that they can avoid interfering with the cover members.

This enables the cover members to move in a widest possible range relative to the outer joint members and eliminates possible obstacle to the movement of the joint over its range of angles.

In addition to the features defined in a first aspect of the present invention, the invention according to a third aspect of the present invention is characterized in that, the cover members are attached to the shafts such as to be able to slide in an axial direction, and that springs are provided for pressing the cover members in a direction in which they make pressure contact with the outer circumferential surface of the outer joint members.

In addition to the features defined in a first aspect of the present invention, the invention according to a fourth aspect of the present invention is characterized in that, a seal ring is provided to a portion of the outer circumferential surface of the outer joint member where it makes sliding contact with the inner spherical surface of the cover member.

This ensures good sealing properties between the cover member and the outer joint member in the case where the cover member is made of metal.

In addition to the features defined in the third or fourth aspect of the present invention, the invention according to a fifth and sixth aspect of the present invention is characterized in that the inner joint members are attached to the shafts such as to be movable in the axial direction.

Thereby, in the case where the double constant velocity universal joint is used for a drive axle, for example, any misalignment between the joint center and the turning center of the king pin is absorbed and corrected by the movement of the inner joint members. The movement of the inner joint members relative to the shafts does not affect at all the sealing properties between the inner spherical surfaces of the cover members and the outer circumferential surfaces of the outer joint members, because the cover members follow the movement of the inner joint members due to the force applied from the springs.

In addition to the features defined in the second aspect of the present invention, the invention according to a seventh aspect of the present invention is characterized in that a grease supply part is provided to a portion of the outer circumferential surface of the outer joint members on the back-to-back side where the diameter thereof is smaller than the largest outside diameter of the outer joint members so as to supply grease to the interior of the outer joint members.

The double constant velocity universal joint has a twice larger internal volume because it has two outer joint members combined, and yet grease supply is possible from one grease supply part. Filling a large amount of grease in this twice larger space reduces troublesome and time-consuming work of supplying grease at appropriate times, and solves the problems of unexpected grease exhaustion or durability deterioration.

As described above, according to the present invention, by combining two constant velocity universal joints, if the limit intersecting angle of one constant velocity universal joint is 27.5°, for example, the double Constant velocity universal joint as a whole can achieve the twice larger intersecting angle of 55°. Also, because of the structure in which the open ends of the outer joint members are mechanically sealed with the inner spherical surfaces of the cover members attached to the shafts, the invention is applicable, with sufficient durability, to drive axles used in harsh environments where no rubber or elastomer boots can be used. Also, because of the structure in which outer joint members of two constant velocity universal joints are united, the internal volume of the outer joint members is twice larger, and a large amount of grease can be contained inside the joint. This reduces trouble of supplying grease at appropriate times, and solves the problems of unexpected grease exhaustion or durability deterioration.

DETAILED DESCRIPTION OF THE PREFERRED EMBODIMENTS

Figure 1:
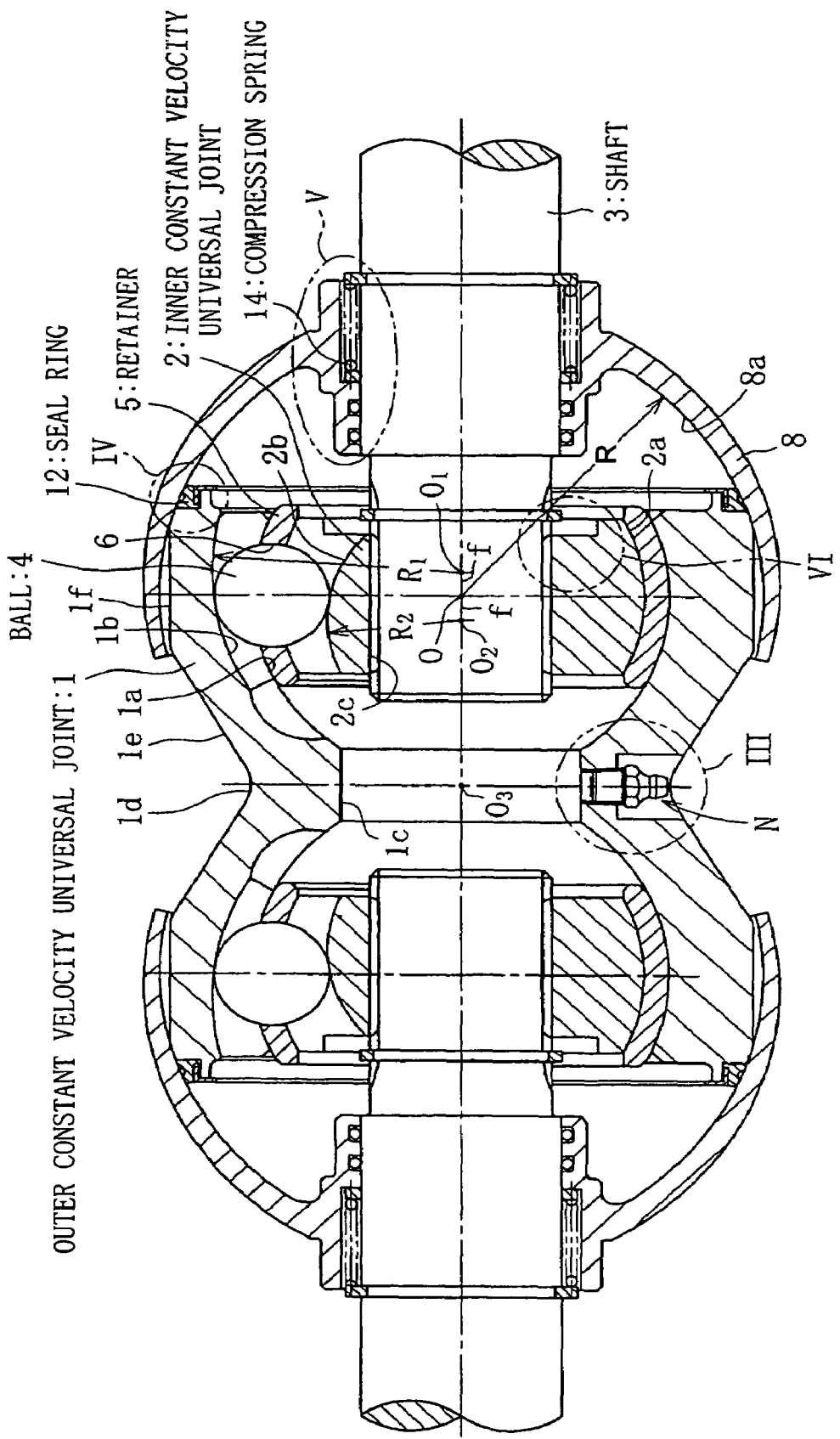
FIG. 1 is a longitudinal cross-sectional view of a double constant velocity universal joint of the invention with an operating angle of 0°.
Figure 2:
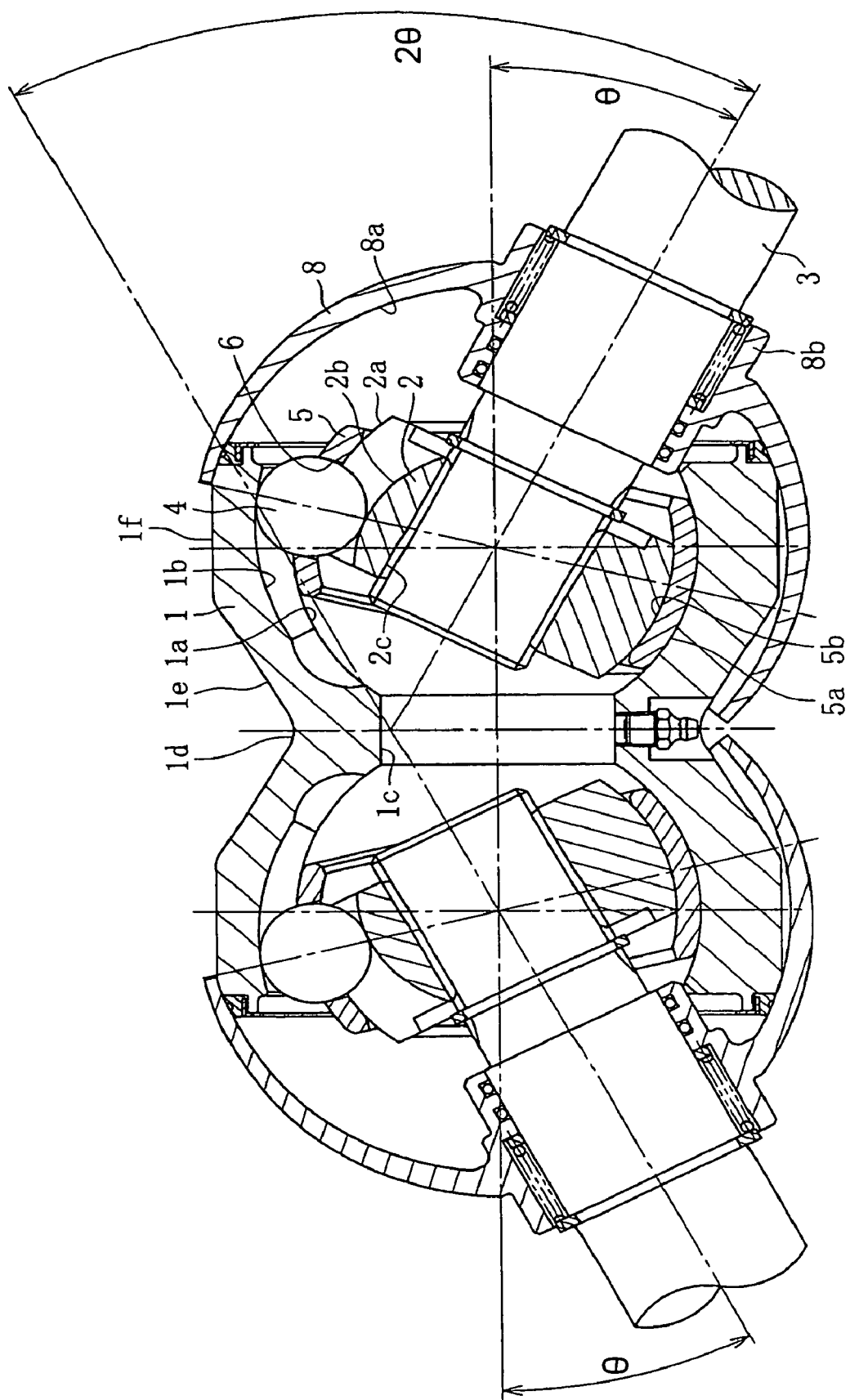
FIG. 2 is a longitudinal cross-sectional view of a double constant velocity universal joint of the invention with a maximum operating angle.
Figure 3:
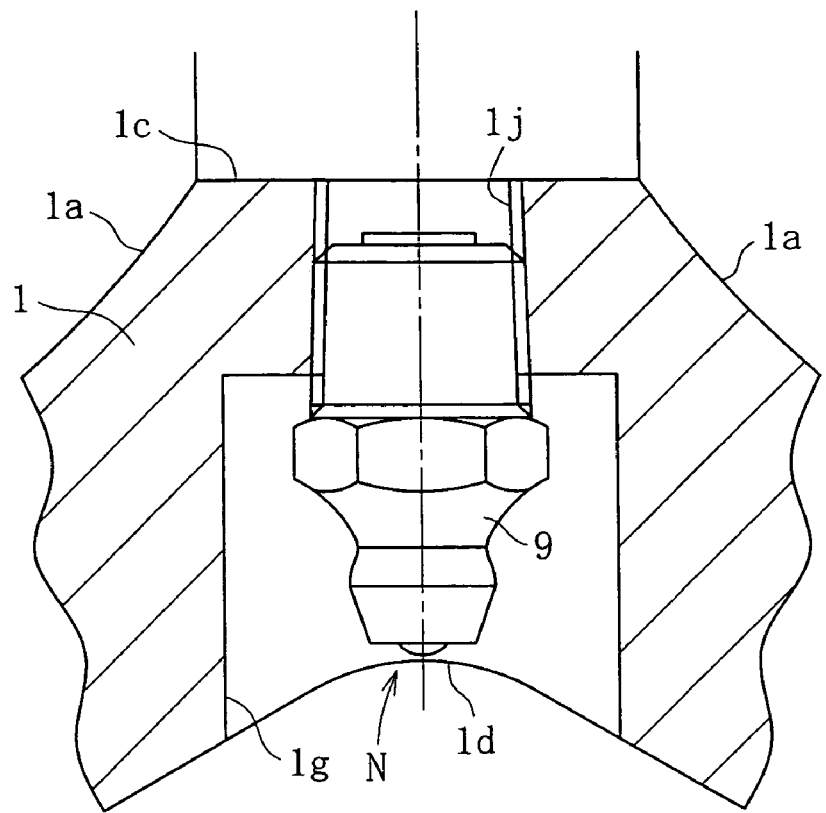
FIG. 3 is an enlarged cross-sectional view of the part III in FIG. 1 illustrating the area around the grease nipple.

One preferred embodiment of the present invention will be hereinafter described with reference to FIG. 1 and FIG. 2. FIG. 1 and FIG. 2 are longitudinal cross-sectional views of the double constant velocity universal joint, the former with an operating angle of 0° and the latter with the maximum operating angle of 55°. This double constant velocity universal joint has a structure in which two joints are combined, each joint having similar specifications as a common fixed constant velocity universal joint that uses balls 4 as torque transmitting members. Hereinafter the description will be made with reference to the one half of the joint for ease of explanation. That is, the one half of this double constant velocity universal joint is composed of a cylindrical outer joint member 1 with six curved guide grooves 1b formed in the axial direction in the inner spherical surface 1a, an inner joint member 2 with six curved guide grooves 2b formed in the axial direction in the outer spherical surface 2a and a spline (or serration) hole 2c, a shaft 3 with one end being fitted in the spline hole 2c, a cover member 8 attached to the shaft 3, six torque transmitting balls 4 each arranged in the ball tracks formed by both guide grooves 1b and 2b of the outer joint member 1 and the inner joint member 2, and a retainer 5 for retaining the balls 4. While the illustrated example has six guide grooves 1b and 2b, the number of guide grooves may be increased up to ten or more.

The outer joint member 1 has a structure in which outer joint members 1 of two constant velocity universal joints are united. "United" here means two separately made outer joint members 1 coupled together, as well as a completely one-piece joint made from the same material. Either way, two outer joint members 1 are coaxially united back to back, with their open ends (shaft 3 side) on the outer side. The united central portion is a connection hole 1c, which connects the interiors of the left and right outer joint members 1. Reinforcement ribs may be formed on the inner surface of the connection hole 1c as required. The outside diameter of the outer joint members 1 on the back-to-back side is smaller than the largest outside diameter of the outer joint members 1 (constricted in the middle). The entire outer joint member 1 with two joints combined has a so-called "catenoid shape" or a "double peanut shape". This middle-constricted shape is for avoiding interference with the cover members 8 to be described later so as to achieve a wide enough operating angle. When the double constant velocity universal joint is used for a drive axle, the cross-sectional plane center $O_3$ of the middle-constricted part 1d coincides substantially with the turning center of the king pin.

The outer circumferential surface of the outer joint member 1 is a cylindrical surface having a center coinciding with the axis of the outer joint member 1, including an inclined linear part 1e inclined in the direction in which the outside diameter increases from the middle-constricted part 1d toward the open end of the outer joint member 1, and a horizontal linear part 1f extending horizontally and straight in parallel with the axis of the outer joint member 1 from the end of the inclined linear part 1e to the edge of the open end. A suitable number of grease supply parts or grease nipples N are arranged at appropriate positions around the constricted part 1d to replenish grease to the inside of the outer joint members 1. The number of grease nipples N should preferably be at least two so as to enable supply of grease irrespective of the joint position when the vehicle is stopped. Blind holes 1g are formed in the constricted part 1d so that the heads of the grease nipples N are encased therein and do not protrude to the outside from the outer circumferential surface of the outer joint members 1 and interfere with the cover members 8.

Figure 4:
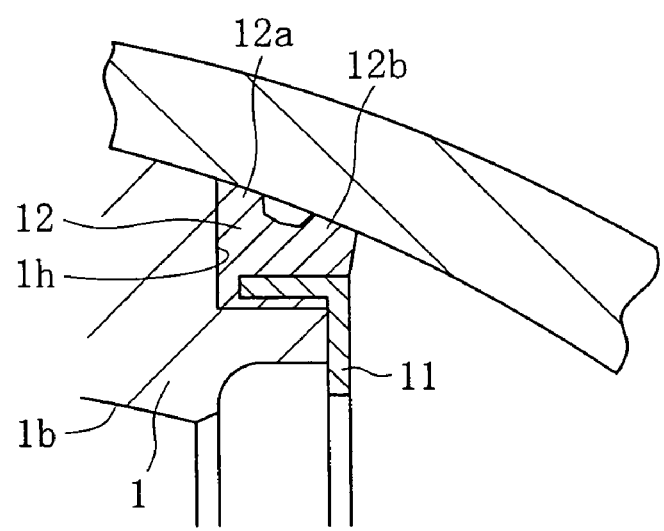
FIG. 4 is an enlarged cross-sectional view of the part IV in FIG. 1 illustrating the area where the outer joint member and the cover member make sliding contact with each other.

At the open end edge of the outer joint member 1 is formed a right-angled step 1h open to the outside, as shown in FIG. 4. A metal ring 11 having an L-shaped cross section is fitted to this right-angled step 1h. This metal ring 11 includes a seal ring 12 joined to its outer side by vulcanization, and the inner surface of the L-shaped cross section of the metal ring 11 is press-fitted to the outer circumferential surface of the right-angled step 1h through a thin film of seal ring material, or directly without a thin film of seal ring material. The metal ring 11 is a sealing member having, as a whole, a substantially square U-shaped or V-shaped cross section with outwardly extending double seal lips 12a and 12b, outer ends of the seal lips 12a and 12b protruding out slightly further than the outer circumferential surface of the outer joint member 1 in their original state. The inner spherical surface 8a of the cover member 8 makes continuous sliding contact all around with the seal lips 12a and 12b.

Figure 5:
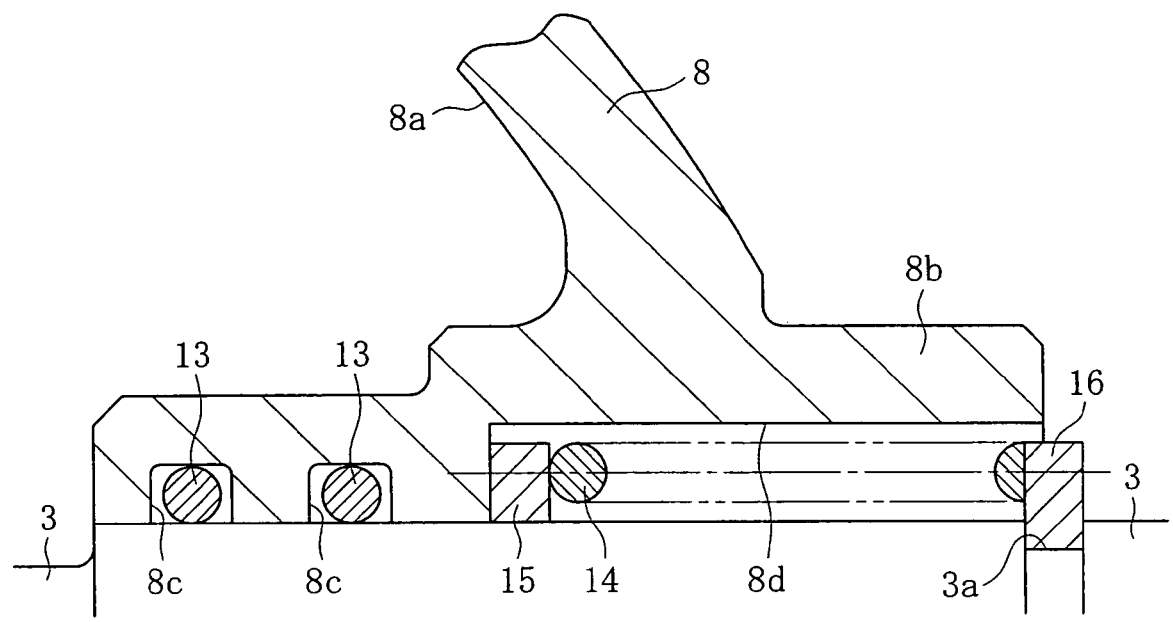
FIG. 5 is an enlarged cross-sectional view of the part V in FIG. 1 illustrating the area where the shaft and the cover member are coupled together.

The cover member 8 is a hollow spherical member having an inner spherical surface 8a that can make sliding contact with the outer circumferential surface of the outer joint member 1. It has a structure in which the hollow spherical member is partly cut out so that part of the outer joint member 1 is fitted inside in sliding contact. This cover member 8 is usually made of metal such as steel in consideration of strength and durability, but other materials can substitute for metal according to needs, such as reinforced resin having a certain strength. The inner spherical surface 8a is a partial spherical surface with a radius R and the center being the center O of the joint. According to needs, resin or other low-friction material may be bonded, baked, or coated to the inner spherical surface 8a of the cover member 8 for reducing friction. In the center of the cover member 8 is formed a boss 8b where the shaft 3 extends through. In the inner circumferential surface of this boss 8b are accommodated double 0-rings 13 and a compression spring 14, as shown in FIG. 5. The double O-rings 13 are fitted in two rows of grooves 8c formed in the inner circumferential surface at the inner end of the boss 8b. The compression spring 14 is accommodated in a recess 8d formed in the inner circumferential surface at the outer end of the boss 8b. A seat ring 15 for the compression spring 14 is arranged at the further end of the recess 8d. An annular groove 3a is formed in the outer circumferential surface of the shaft 3 at the position matching with the outer end of the boss 8b. In this annular groove 3a is fixedly fitted a snap ring 16. The compression spring 14 is compressed with a predetermined pressure and accommodated between the seat ring 15 and the snap ring 16.

The distal end of the shaft 3 fits into the spline hole 2c of the inner joint member 2, and it is restricted from moving relative to the inner joint member 2 with a square circlip 17. The square circlip 17 has a square cross section and fits in an annular groove 3b formed in the outer circumferential surface of the shaft 3.

It is preferable to provide a clearance C of about 1 to 2 mm between the square circlip 17 and the inner joint member 2. This allows the inner joint member 2 to move in the axial direction relative to the shaft 3. When the double constant velocity universal joint is used for a drive axle, it is hard to match the joint center $O_3$ completely with the turning center of the king pin. By making the double constant velocity universal joint movable in the axial direction of the shaft 3, any misalignment in these centers can be absorbed or corrected. Such axial movement of the double constant velocity universal joint does not affect at all the sealing properties between the inner spherical surface 8a of the cover member 8 and the seal ring 12 because the cover member 8 follows the movement of the inner joint member 2 due to the force from the compression spring 14.

The left and right constant velocity universal joints alone without the cover member 8 are conventionally known ball fixed joints. When the operating angle is 0° as shown in FIG. 1, the centers $O_1$ and $O_2$ of the radii $R_1$ and $R_2$ of the two guide grooves 1b and 2b of the outer joint member 1 and the inner joint member 2 are respectively offset by an equal distance f oppositely in the axial direction relative to the common center O (joint center) of the inner spherical surface 1a of the outer joint member 1 and the outer spherical surface 2a of the inner joint member 2. Therefore, the ball tracks formed by the guide grooves 1b and corresponding guide grooves 2b are wedge-shaped opening to the open end of the joint.

The retainer 5 is made of a circular member, its outer surface being a spherical surface 5a making sliding contact with the inner spherical surface 1a of the outer joint member 1 and its inner surface being a spherical surface 5b making sliding contact with the outer spherical surface 2a of the inner joint member 2. The same number of windows 6 as the balls 4 are opened through the circumferential wall of the retainer 5 by grinding or milling. The shape of the windows 6 is for example square, and they are evenly spaced about the retainer 5.

The double constant velocity universal joint of the present invention has the above-described structure. When the outer joint member 1 and the inner joint member 2 are positioned to each other with an operating angle of 0° as shown in FIG. 1, the balls 4 are retained within a plane that contains the joint center O and is vertical to the rotating axis because of the effect of the offset centers of radius of curvature $O_1$ and $O_2$ of the guide grooves 1b and 2b of the outer joint member 1 and the inner joint member 2. Torque is transmitted in this state.

Next, when the inner joint members 2 are bent relative to the outer joint member 1 to the limit operating angle θ on both sides of the double constant velocity universal joint as shown in FIG. 2, the double constant velocity universal joint as a whole achieves an operating angle of 2θ. At this time, the inner ends of the bosses 8b of the cover members 8 abut the open ends of the outer joint members 1. The torque transmitting balls 4 are arranged within a plane that bisects the angle θ by the retainer 5. This ensures constant velocity of the joint.

In the state shown in FIG. 1, the left and right seal rings 12 make tight contact all around with the inner spherical surfaces 8a of the cover members 8. Even when the inner joint members 2 are angularly displaced relative to the outer joint members 1 by the angle θ as shown in FIG. 2, the left and right seal rings remain in tight contact all around with the inner spherical surfaces 8a of the cover members 8 similarly to the state shown in FIG. 1 all through the process. No gap is formed between the seal rings 12 and the spherical surfaces 8a of the cover members 8 because of the compression springs 14 pushing the cover members 8 always toward the side of the seal rings 12 of the outer joint members 1.

Figure 6:
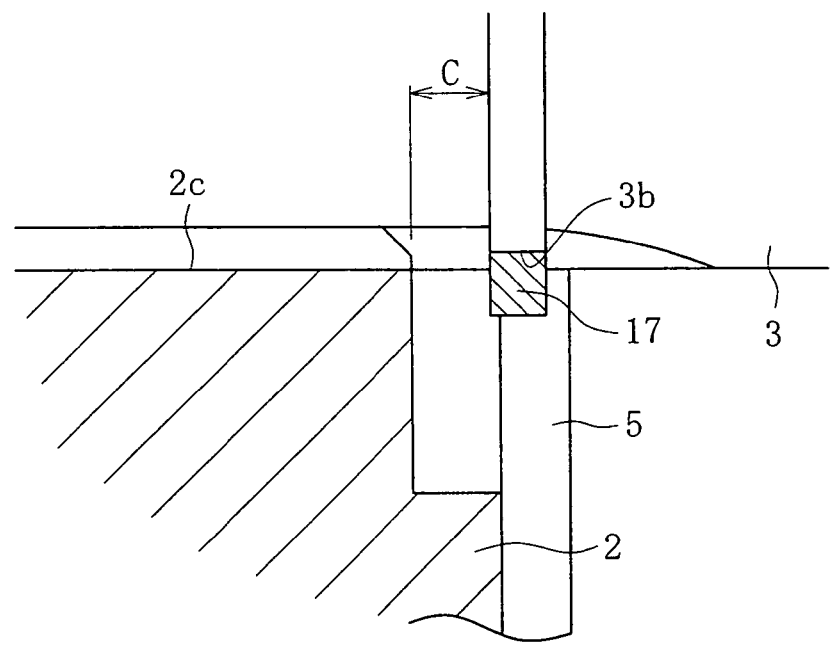
FIG. 6 is an enlarged cross-sectional view of the part VI in FIG. 1 illustrating the area where the shaft and the inner joint member are coupled together.

When the double constant velocity universal joint is used for a drive axle, the center position $O_3$ in the middle of the left and right outer joint members 1 coincides substantially with the turning center of the king pin. However, the center position $O_3$ often does not coincide with the turning center of the king pin completely due to dimensional errors of components, gaps, and other factors. In this invention, a clearance C (of 1 to 2 mm) is provided adjacent the square circlip 17 shown in FIG. 6 so that the double constant velocity universal joint is movable in the axial direction of the shaft 3. Any misalignment between the center position $O_3$ and the turning center of the king pin can thereby be absorbed and corrected. Thus, the inner spherical surfaces 8a of the cover members 8 are pressed against the seal rings 12 by the force of the compression springs 14 in consideration of possible axial movement of the double constant velocity universal joint.

During rotation of the double constant velocity universal joint, the balls 4 and the surroundings of the retainer 5 are lubricated with grease filled inside the outer joint members 1. The left and right outer joint members 1 are united and the internal volume is nearly twice larger than that of a single outer joint member 1. Therefore, a sufficient amount of grease is kept inside the joint. Grease can be supplied from the grease nipple N at one location. Further, grease can reliably be provided to the parts that require lubrication.

While the invention has been described in its preferred embodiment, it is to be understood that the invention is not limited to this embodiment and that changes and variations may be made without departing from the spirit or scope of the following claims.

The application of the double constant velocity universal joint of the present invention is not limited to a drive axle of an agricultural tractor and is also applicable to drive axles of various other vehicles or industrial machines that require a wide operating angle and are used under harsh environments.

The invention claimed is:

1. A double constant velocity universal joint, comprising:

two constant velocity universal joints, each constant velocity universal joint including a cylindrical outer joint member with a plurality of axially extending guide grooves in a spherical inner circumferential surface thereof, an inner joint member with a plurality of axially extending guide grooves formed in a spherical outer circumferential surface thereof, torque transmitting balls each arranged in ball tracks formed by both the guide grooves of the outer joint member and the inner joint member, a retainer for retaining the balls, and a cover member attached to a shaft that is connected to the inner joint member, the cover member having an inner spherical surface that makes sliding contact with an outer circumferential surface of the outer joint member, wherein the outer joint members are coaxially united at back surfaces thereof, wherein an outside diameter of the outer joint members at the back surfaces is smaller than the largest outside diameter of the outer joint members so that the outer joint members do not interfere with the cover members, and wherein a grease supply part is provided at a portion of the outer circumferential surfaces of the outer joint members at the back surfaces of the outer joint members so as to supply grease to an interior of the outer joint members, wherein the grease supply part is arranged so as not to protrude from the outer circumferential surfaces of the outer joint members to an exterior of the outer joint members.

2. A double constant velocity universal joint according to claim 1, wherein the cover members are attached to the shafts so as to be able to slide in an axial direction, and wherein each constant velocity universal joint includes a spring for pressing the cover member in a direction so as to make contact with and apply pressure to the outer circumferential surface of the outer joint member.

3. A double constant velocity universal joint according to claim 2, wherein the inner joint members are attached to the shafts so as to be movable in the axial direction.

4. A double constant velocity universal joint according to claim 1, wherein each constant velocity universal joint includes a seal ring provided at a portion of the outer circumferential surface of the outer joint member so as to make sliding contact with the inner spherical surface of the cover member.

5. A double constant velocity universal joint according to claim 4, wherein the inner joint members are attached to the shafts so as to be movable in an axial direction.

* * * * *